Ichitaro Hayashi
Yoshiro Nishiwaki
INVENTORS
BY Wenderoth, Lind and Ponack
ATTORNEYS Ichitaro Hayashi
Yoshiro Nishiwaki
INVENTORS
BY Wenderoth, Lind and Ponack
ATTORNEYS United States Patent Office 3,428,760
Patented Feb. 18, 1969

3,428,760
TAPE GUIDE DRUM FOR HELICAL SCAN MAGNETIC RECORDING WITH STATIONARY HEADS MOUNTED IN SAID DRUM

Ichitaro Hayashi and Yoshiro Nishiwaki, Yokohama, Japan, assignors to Victor Company of Japan Ltd., Kanagawa-ku, Yokohama, Japan
Continuation-in-part of application Ser. No. 144,267, Oct. 10, 1961. This application June 15, 1965, Ser. No. 464,109
U.S. Cl. 179—100.2 5 Claims
Int. Cl. G11b 5/00

ABSTRACT OF THE DISCLOSURE

A magnetic tape guide drum for use in a device for recording and reproducing a wide band signal, such as a television signal, on a magnetic tape. The guide drum for magnetic tape has a peripheral surface spirally guiding said magnetic tape. A rotary disk is housed in said drum and at least one rotatable magnetic head is mounted on said rotary disk and exposed through said drum to record and reproduce said wide band signal diagonally on the magnetic tape. At least one stationary magnetic head for recording and reproducing a control signal is mounted in said drum and exposed on said surface, said stationary magnetic head being in contact with the edge area of said tape moving around said magnetic tape guide drum.

This invention relates to a tape guide drum for use in the magnetic recording and reproducing of wide band signals, and more particularly to an apparatus for magnetic recording and reproducing of wide band signals, such as television video signals, wherein other signals related to the wide band signals are recorded and reproduced by a stationary magnetic head.

This application is a continuation-in-part of our application Ser. 144,267 filed Oct. 10, 1961, now abandoned.

In a known apparatus for magnetic recording and reproducing of television video signals, a magnetic tape fed from a supply reel is led to a tape guide drum and a rotary magnetic head provided adjacent to the drum records said television video signals magnetically. The tape is further led to another stationary head for recording control signals or audio signals by means of which such desired signals are recorded, and thereafter the tape is wound on a take-up reel and is produced by a reproducing head.

However, exact control during the process of reproducing video signals has been difficult to achieve with such a known apparatus, because the positions on the tape of the control signals for recording or reproducing are different from the positions of the video signals on the same tape. In other words, a tape is subject to shrinkage and elongation and disturbances from outside influences such as wow or flutter, and therefore slight fluctuations of the tape at the time when video signals are recorded or reproduced do not reproduce the same fluctuations at the time when control signals are recorded or reproduced. Thus the control is not exact. The fluctuations become larger as the distance between the point where video signals are recorded or reproduced and the point where control signals are recorded or reproduced becomes larger. Moreover, when sections of the tape are spliced together, it sometimes happens that the audio signals corresponding to the video signals are omitted during the cutting of the tape preparatory to the splicing, because the point at which the video signals are recorded is far from the point at which the corresponding audio signals are recorded.

The present invention provides a recording and reproducing apparatus which eliminates said defects in the known apparatuses.

It is an object of the present invention to provide a new type tape guide drum which can achieve exact control at the time of magnetic recording and reproducing.

Another object of the present invention is to provide a tape guide drum which can record control signals on a tape during the period when video signals are being recorded on the tape.

A further object of the present invention is to provide a tape guide drum which can record signals other than video signals such as control and audio signals on the tape in such a manner that the other signals will be on the tape in proper relation to the video signals when the tape is cut and spliced.

A still further object of the present invention is to provide a tape guide drum which enables the magnetic recording and reproducing apparatus to be compact and without making it necessary to provide any particular place outside of said tape guide drum for respective stationary magnetic heads for recording and reproducing said control signals or audio signals.

In describing the invention in detail, reference will be made to the accompanying drawings, in which:

FIG. 5 is a perspective view of a guide drum according to the present invention;

Figure 1:
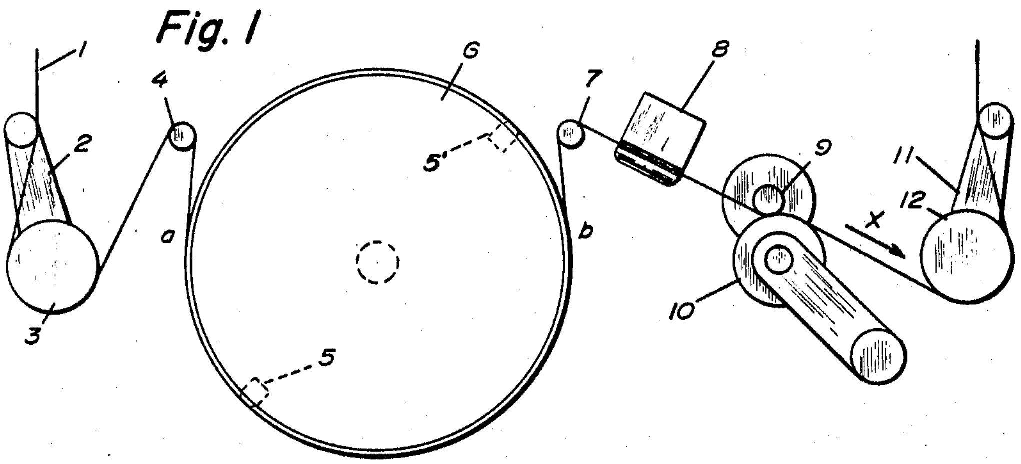
FIG. 1 is a diagrammatic plan view showing the important parts of a hitherto known apparatus for magnetic recording and reproducing.

In FIG. 1, which illustrates the impotrant parts of a hitherto known magnetic recording and reproducing apparatus having a guide drum, there is a magnetic tape 1 fed from a supply reel (not shown). Said magnetic tape is led to tape guided drum 6 which contains magnetic heads 5 and 5', which rotate within the drum, around a flanged roll 3 having a tension arm 2 and around a guide roll 4. The tape 1 contacts the guide drum 6 along a spiral shaped path extending between points *a* and *b* in FIG. 1, about half the circumference of the drum. Between the points *a* and *b*, television video signals are recorded on the magnetic tape by the rotating magnetic heads. After that, the tape is guided so as to come into contact with a stationary magnetic head 8 for recording and reproducing audio signals. Then the tape travels through a capstan 9 which drives the tape in the direction indicated by the arrow X and through a pinch roll 10 which presses the tape against the capstan, and then around a flanged roll 12 which has a tension arm 11, and finally it is wound around a take-up reel (not shown).

Figures 3, 4:
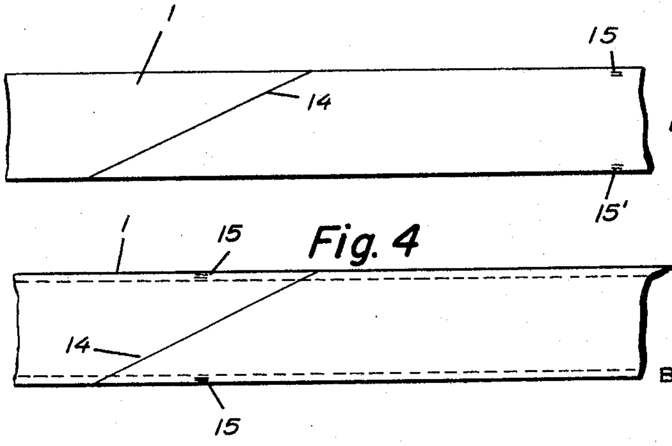
FIG. 3 is a diagrammatic representation of recorded track patterns on a magnetic tape recorded by a hitherto known apparatus.
FIG. 4 is a diagrammatic representation of recorded track patterns on a magnetic tape recorded by an apparatus for recording and reproducing employing a guide drum according to the present invention.

FIG. 3 shows a pattern of tracks recorded on the magnetic tape 1. The track 14 is the track of the recorded television video signals, and extends diagonally on the magnetic tape during the period the rotary magnetic head 5, 5' scans between points *a* and *b* on the drum. Tracks 15 and 15' are tracks of recorded control signals and audio signals, and they precede by a considerable distance the recording corresponding video signals 14, because the stationary magnetic head 8 is in a position in which it records on the tape down run of the rotary magnetic head in the tape guide drum 6.

When the magnetic tape is driven, the tape is subject to shrinkage and elongation and other disturbances due to wow or flutter, and therefore slight fluctuations of the tape occur during the running of the tape.

When reproducing from the tape, the slight fluctuation of the tape during running of the tape causes a time lag between video signals which have been obtained from scanning and reproducing the video signal track 14 by means of the rotating magnetic heads 5 and 5′ and signals such as control signals or audio signals which have been obtained from scanning and reproducing the tracks 15 and 15′ by the stationary magnetic head 8. It is clear that the larger the distance between the guide drum 6 having the rotating magnetic heads and the stationary magnetic head 8 the greater the time lag between the reproduced video signals and the reproduced control signals or audio signals. Because strict control is required for recording or reproducing television video signals, above mentioned time fluctuation and lag should be avoided.

Further, in the hitherto known method, splicing magnetic tapes, frequently portions of magnetic tape containing control signals or audio signals are cut off other portions containing the desired video signals, because the video signals on the tape are remote from control signals or audio signals corresponding to said video signals.

The present invention overcomes the above mentioned defects and will be described hereinafter with reference to the embodiment shown in the accompanying drawings.

Figure 2:
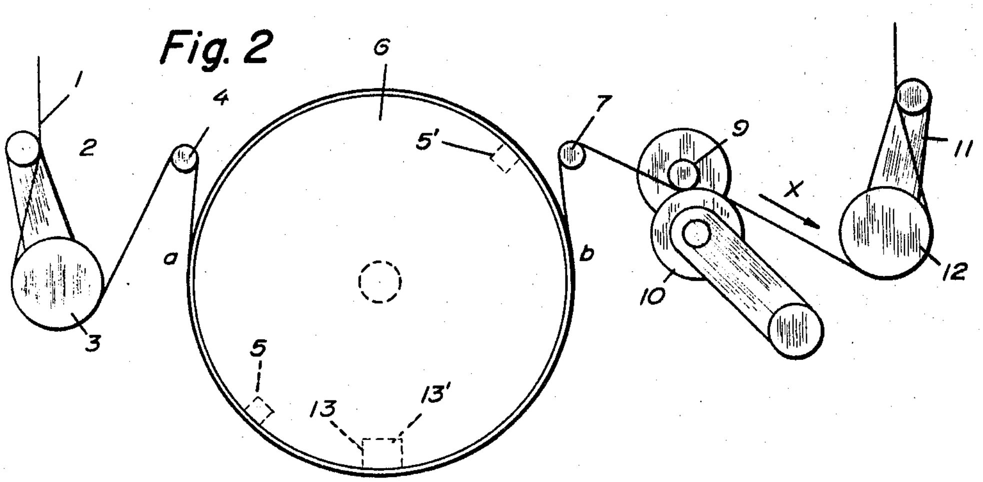
FIG. 2 is a diagrammatic plan view showing the important parts of an apparatus for magnetic recording and reproducing and employing a guide drum according to the present invention.

FIG. 2 shows the important parts of an apparatus for recording and reproducing in connection with magnetic tapes, which parts include a tape guide drum according to the present invention. Corresponding reference characters are used for the parts which are the same as shown in FIG. 1.

Figure 6:
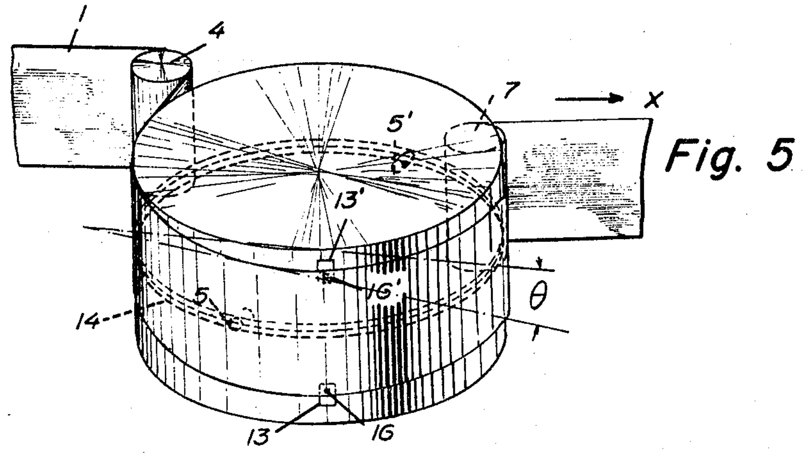
FIG. 6 is a partial sectional view taken along line A—A'in FIG. 5.

In FIG. 2, FIG. 5 and FIG. 6, there is shown a guide drum 6 which houses a rotating body 14.

The rotating body 14 is provided with two magnetic heads 5 and 5′ for recording and reproducing video signals. These heads are diametrally opposit each other on the body 14. In the drum 6 is positioned a first stationary magnetic head 13 for recording or reproducing control signals, which head is employed instead of a stationary magnetic head 8 spaced from the drum 6 as in hitherto known apparatuses. A second stationary magnetic head 13′ for recording and reproducing audio signals is also provided. The heads 13 and 13′ are in positions such that the respective head tips 16 and 16′ contact the tape 1 which is caused to run helically around the drum 6 by off set and skew positioning of guide rolls 4 and 7. The stationary magnetic heads 13 and 13′ for recording and reproducing control signals and audio signals are located between points $a$ and $b$ in FIG. 2, i.e. at a position where video signals are being recorded on the tape with the rotating magnetic heads 5 and 5′, and are postioned such that control signals or audio signals are recorded on the margin of the tape on which video signals have not been recorded so as not to interfere with the video signals recorded on the tape. The distance the heads 13 and 13′ project out of the drum 6 can be regulated by screws 17 and 17′ acting against the pressure of springs 22 and 22′ urging the heads outwardly, so that the contact pressure of each of the head tips 16 and 16′ on the tape 1 can be regulated.

It will be seen from FIG. 4 that the tracks on which the video signals are recorded terminate short of the edges of the tape, leaving spaces for the control and audio signals. This is accomplished by making the helix angle $\theta$ such that when the tape first contacts drum 6 at $a$, the head 5 or 5′ will strike the tape through the slot through which the heads 5 and 5′ are exposed at a point inwardly of the the edge of tape 1, and leaves the tape at point $b$ at a point spaced inwardly of the edge of tape 1.

It is clear, as illustrated in FIG. 4 that tracks 15 and 15′ formed by the respective heads 13 and 13′ are within a section along the length of the tape wherein corresponding tracks for video signals 14 are recorded or reproduced because the head 13 for the control signals and the head 13′ for audio signals (13′) are located between points $a$ and $b$ where video signals are recorded or reproduced.

Thus exact control can be achieved even when small fluctuations occur at the time and at a point where video signals are recorded and reproduced, because at the same time control signals are subject to corresponding fluctuations.

Moreover the tape is saved when splicing it when desired video signals are used, very few additional portions of the tape for control signals and audio signals corresponding to the video signals are required.

The stationary magnetic head for control signals should be positioned about midway between points $a$ and $b$ so that the mean fluctuations between the points $a$ and $b$ on the drum of the tape 1 are taken into account.

Figure 7:
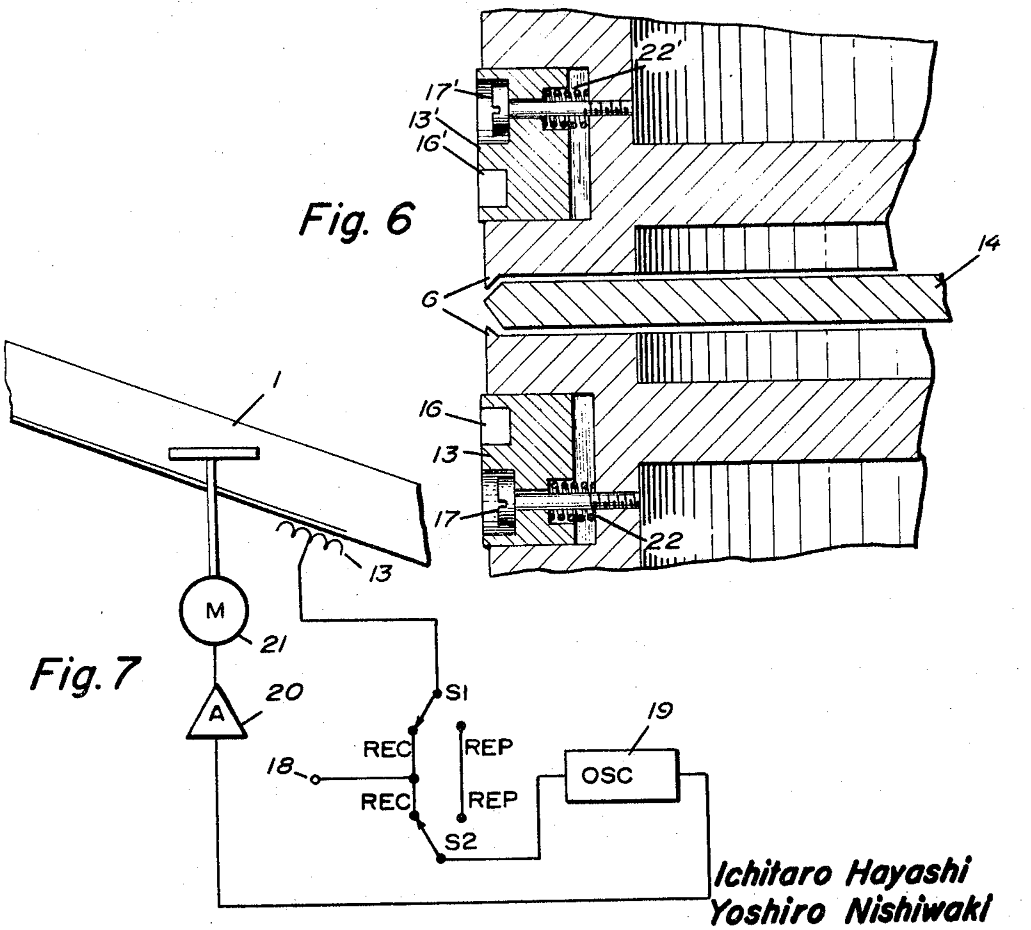
FIG. 7 is a block diagram showing an embodiment of a control system for use with a guide drum according to the present invention.

FIG. 7 shows an embodiment of a control system which can be adapted to the tape guide according to the present invention. At recording, switches $S_1$ and $S_2$ are turned to Rec., and the pulses of vertical synchronizing signals for video signals put into the circuit from terminal 18 are on one hand recorded through the switch $S_1$ on the margin of the tape 1 by the head 13 for control signals, while on the other hand a synchronous motor 21 driving the rotating magnetic head is driven through AFC oscillator 19 and motor driving amplifier 20 through the switch $S_2$. At the time of reproducing, the switches $S_1$ and $S_2$ are turned to the Rep. side, and the control signals reproduced by a head for control signals 13 are fed to the AFC oscillator 19 and fed further to the synchronous motor 21 through the motor driving amplifier 20 so that the rotating magnetic head is driven at a frequency corresponding to the control signals. Accordingly when there are any changes in the control signals recorded or reproduced, then the turning phase of rotating head is changed correspondingly and the control signals are scanned during the period of scanning and reproducing the video signals. Therefore exact control can be obtained during the running of the tape.

This invention may be changed or modified so long as such changes or modifications may be made without departing from the spirit and scope thereof.

We claim:

1. In an apparatus for magnetic recording and reproducing of wide band signals on a magnetic tape, a tape guided rum comprising a drum having a surface for guiding and contacting said magnetic tape in a helical path thereon, a rotating body housed in said drum, at least one magnetic head mounted on the periphery of said body and exposed through said drum for recording and reproducing said wide band signals diagonally across said magnetic tape, and at least one stationary magnetic head mounted in said drum and exposed at said surface for recording and reproducing control signals, said stationary magnetic head being positioned for contacting a margin of said magnetic tape at a point about at the middle of the length of tape in contact with said surface.

2. A tape guide drum as claimed in claim 1 in which said stationary head has a screw extending therethrough and into said drum in a direction perpendicular to said surface and inwardly of the drum and said stationary head is spring urged outwardly of said drum whereby the amount the head projects from the drum can be adjusted by turning said screw.

3. A tape guide drum as claimed in claim 1 further comprises a second magnetic head mounted on the periphery of said body, the two magnetic heads being disposed diametrally opposite each other on the periphery of said rotating body.

4. In an apparatus for magnetic recording and reproducing of wide band signals on a magnetic tape, a tape guide drum comprising a drum having a surface for guiding and contacting said magnetic tape in a helical path thereon, a rotating body housed in said drum, a magnetic head mounted on the periphery of said body and exposed through said drum for recording and reproducing said wide band signals diagonally across said magnetic tape, a first stationary magnetic head mounted in said drum and exposed at said surface for recording and reproducing control signals, said first stationary magnetic head being positioned for contacting one margin of the tape, and a second stationary magnetic head mounted in said drum and exposed at said surface for recording and reproducing audio signals and the like, said second stationary magnetic head being positioned for contacting the other margin of the tape, said stationary heads being positioned for contacting the tape at a point about at the middle of the length of tape in contact with said surface.

5. A tape guide drum as claimed in claim 4 in which there is a further magnetic head mounted on said rotating body diametrally opposite the first-mentioned magnetic head on said rotating body.

References Cited

UNITED STATES PATENTS

| | | | |
|---|---|---|---|
| 2,773,120 | 12/1956 | Masterson | 179—100.2 |
| 3,013,123 | 12/1961 | Camras | 179—100.2 |
| 3,032,884 | 5/1962 | Collins et al. | 179—100.2 |
| 3,107,280 | 10/1963 | Suetsugu | 179—100.2 |

BERNARD KONICK, *Primary Examiner.*

J. R. GOUDEAU, *Assistant Examiner.*

U.S. Cl. X.R.

178—6.6